CENTRALIZED TRAFFIC CONTROL SYSTEM OF THE NORMALLY DEENERGIZED REVERSIBLE CODED TRACK CIRCUIT TYPE

Filed May 29, 1945 8 Sheets-Sheet 1

INVENTOR.
Henry S. Young.
BY
A. L. Vencill
HIS ATTORNEY.

May 12, 1953 H. S. YOUNG 2,638,535

CENTRALIZED TRAFFIC CONTROL SYSTEM OF THE NORMALLY DEENERGIZED REVERSIBLE CODED TRACK CIRCUIT TYPE

Filed May 29, 1945 8 Sheets-Sheet 2

INVENTOR.
Henry S. Young.
BY
A. L. Leneille (signature)
HIS ATTORNEY.

May 12, 1953 H. S. YOUNG 2,638,535

CENTRALIZED TRAFFIC CONTROL SYSTEM OF THE NORMALLY DEENERGIZED REVERSIBLE CODED TRACK CIRCUIT TYPE

Filed May 29, 1945 8 Sheets-Sheet 3

INVENTOR.
Henry S. Young.
BY
A. L. Vencill
HIS ATTORNEY.

INVENTOR.
Henry S. Young.
BY
A. L. Vencill
HIS ATTORNEY.

INVENTOR.
Henry S. Young.
BY A. L. Vencill
HIS ATTORNEY.

May 12, 1953 H. S. YOUNG 2,638,535

CENTRALIZED TRAFFIC CONTROL SYSTEM OF THE NORMALLY DEENERGIZED REVERSIBLE CODED TRACK CIRCUIT TYPE

Filed May 29, 1945 8 Sheets-Sheet 6

INVENTOR.
Henry S. Young.
BY A. L. Vencill
HIS ATTORNEY.

INVENTOR.
Henry S. Young.
BY A. L. Vencill
HIS ATTORNEY.

INVENTOR.
Henry S. Young.
BY A. L. Vencill
HIS ATTORNEY.

Patented May 12, 1953 2,638,535

UNITED STATES PATENT OFFICE 2,638,535

CENTRALIZED TRAFFIC CONTROL SYSTEM OF THE NORMALLY DEENERGIZED REVERSIBLE CODED TRACK CIRCUIT TYPE

Henry S. Young, Wilkinsburg, Pa., assignor to Westinghouse Air Brake Company, a corporation of Pennsylvania Application May 29, 1945, Serial No. 596,470

11 Claims. (Cl. 246—3)

Figure 1A:
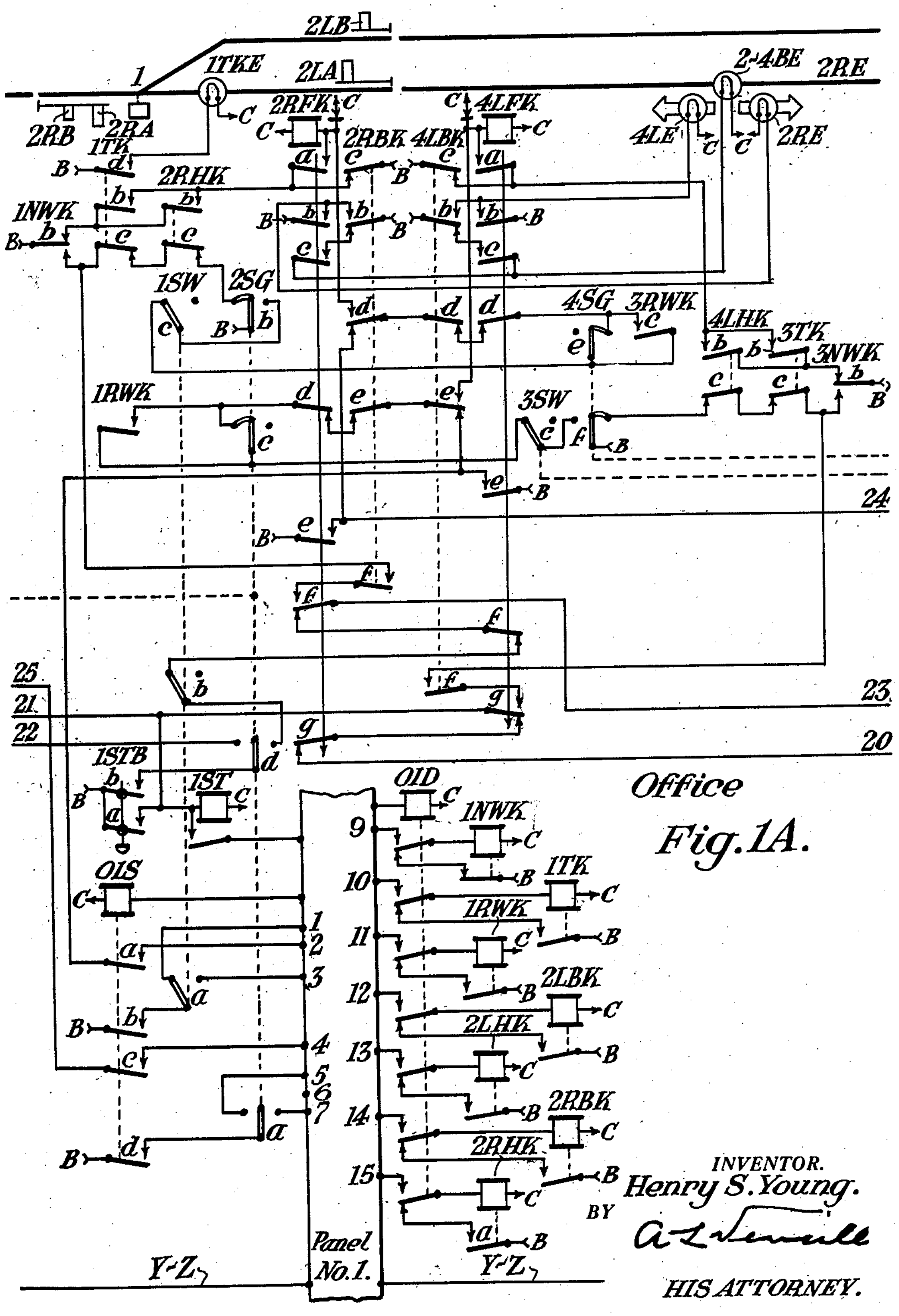

My invention relates to railway traffic controlling apparatus for governing the movement of traffic over stretches of single track, over which traffic moves in two directions. More particularly, my invention relates to a centralized traffic control system for railroads of the normally deenergized reversible coded track circuit type, such as is shown, for example, in Letters Patent of the United States No. 2,344,573, issued March 21, 1944, to James J. Van Horn, which patent was reissued as Re. 22,915 on September 16, 1947. In the system of this patent, the traffic direction through the blocks is set up and the head block signals are cleared by manual control from a central office by means of an intermittently operated code type communication system, such as that shown in Letters Patent of the United States No. 2,229,249, issued January 21, 1941, to Lloyd V. Lewis, and employing cascade connected reversible track circuits of the continuous code type for the protection of traffic movements. Systems of this type possess the advantage that no line wires are needed, other than a pair of wires extending the length of the controlled territory for telephone and code communication between the control office and the field stations of the system, and such wires as may be required to supply power to isolated locations.

One feature of my invention is the provision of a system of the type described which automatically assumes a normally deenergized condition when its operation is not needed, thereby reducing the power consumed by the signals and track circuits to such an extent as to render it practicable to energize them by primary batteries and thereby eliminate the necessity for a power line along the tracks except for relatively short stretches, since in the majority of cases a supply of power sufficient to operate the track switches and other apparatus at the way stations is attainable by connections to local nearby power lines.

The system of my invention is arranged to be set into operation, one block at a time, by the transmission of control codes from the office to operate traffic relays at the exit ends of the blocks for energizing the track circuits in the desired direction, which codes are transmitted automatically when required, as the result of the manual initiation of other control codes for transmission to the entrance ends of the blocks, for the purpose of clearing the head block signals by which traffic movements into the blocks are governed. The track circuits are arranged to provide the usual three indication control for the signals and in addition to provide distinctive indication of the presence of a train in any track section in the block, which indication is transmitted to the office by the communication system to govern suitable track occupancy and traffic direction indicators.

The coded track circuits as shown herein are of the low frequency continuous code type, employing battery currents interrupted at the rate of 75 times per minute to provide caution signal control and to control the block indicator at the office when the block embraces only one section, or at the rate of 120 or 180 times per minute to provide proceed signal control, the 180 code selectively controlling the block indicator in case the block embraces more than one section.

Briefly described, my invention is embodied in apparatus at the control office for governing the traffic relays at the ends of a block, in a normally deenergized manual block signaling system of the general type shown in the hereinbefore mentioned Van Horn Reissue Patent Re. 22,915. For this purpose, I provide two electrically interlocked direction locking relays at the office (LFK and RFK) controlled by the signal levers. These relays correspond generally to relays 8LP and 8RP of the patent referred to, but a traffic lever such as the lever 8 which controls these relays in the patent is not needed, and my direction locking relays are controlled according to the position of the signal levers by block indication relays (LBK and RBK) governed by indication codes, but with improved circuits requiring only one indication channel instead of two as in the patent referred to.

My invention includes means rendering the traffic relays at the ends of the blocks operable between their normal and reverse positions only when both direction locking relays are released and indicate that the trackway system is deenergized. Under this condition the operation of the usual code starting button associated with a signal lever which has been reversed, by which the transmission of a control code for clearing the corresponding signal is initiated, results in the initiation of a second control code, governed by the same lever, which is transmitted to the opposite end of the block to operate the traffic relay at that end as required to energize the track circuit system in the direction selected by signal lever operation.

These operations may be cancelled by pressing the same starting button again, with the signal lever in its normal position, at any time prior to their completion, as indicated by the reception of an indication code which indicates the clearing of the corresponding signal. The block indication relay which is operated by this code energizes the corresponding direction locking relay, which relay then serves to maintain the established direction of traffic when the entering signal has been cleared or as long as a train occupies any portion of the block. Another feature of my invention resides in the provision of means causing the trackway system to revert automatically to its deenergized condition when no longer needed. This feature is embodied in circuits controlled by the block indication relays which serve concurrently to release the operated direction locking relay and to initiate the automatic transmission of a control code to the exit end of the block in response to the reception of a block clear indication from the entrance end when the block is vacated by a train, provided the lever for the entering signal has already been restored to its normal position by the operator, this control code serving to restore the operated traffic relay to its normal inactive condition.

A further feature of my invention is the provision of improved means requiring cooperation by the central office operator to effect the release of electric switch locks for safeguarding the operation of outlying hand throw switches, the arrangement being such that for a train movement from the main track to the side track, the hand throw switch may be unlocked by the train crew provided the train occupies a short detector section in the main track adjacent the switch. For a movement from the side track to the main track, the central office operator moves a three position switch lever for the switch to a left-hand or right-hand position depending upon the direction the train is to move after entering the main track, thereby starting the transmission of a control code to the station at the exit end of the block to set up the track circuits for the block in the corresponding direction. The train crew cooperate by removing a padlock or the like to open a contact in a local circuit at the switch location. If the entire block is vacant, the setting up of the trackway circuits results in the transmission of a block clear indication from the station at the entrance end, and this in turn initiates the transmission of a control code from the office to the station at the entrance end by which steady current is temporarily supplied to the track circuit system, blocking the reception of coded current and causing the transmission of a block occupied indication to the office to hold the existing direction established. A further effect of the steady current impulse is to reverse the direction of the coded track circuits between the entrance end of the block and the switch location, coded current being supplied to the track rails at both ends of the block after the steady current impulse is terminated. The switch becomes unlocked when coded currents are received at the switch location, from both directions.

When the operator is advised by the train crew that the train has entered the main track and that the hand throw switch is again locked normal, he restores the operated switch lever to normal, thereby transmitting a code by which the trackway apparatus is restored to its usual condition for one direction operation, the apparatus returning automatically to its normal inactive condition when the train vacates the block.

Other objects and features of my invention will be pointed out as the description proceeds.

I shall describe one form of apparatus embodying my invention, and shall then point out the novel features thereof in claims.

Figure 1B:
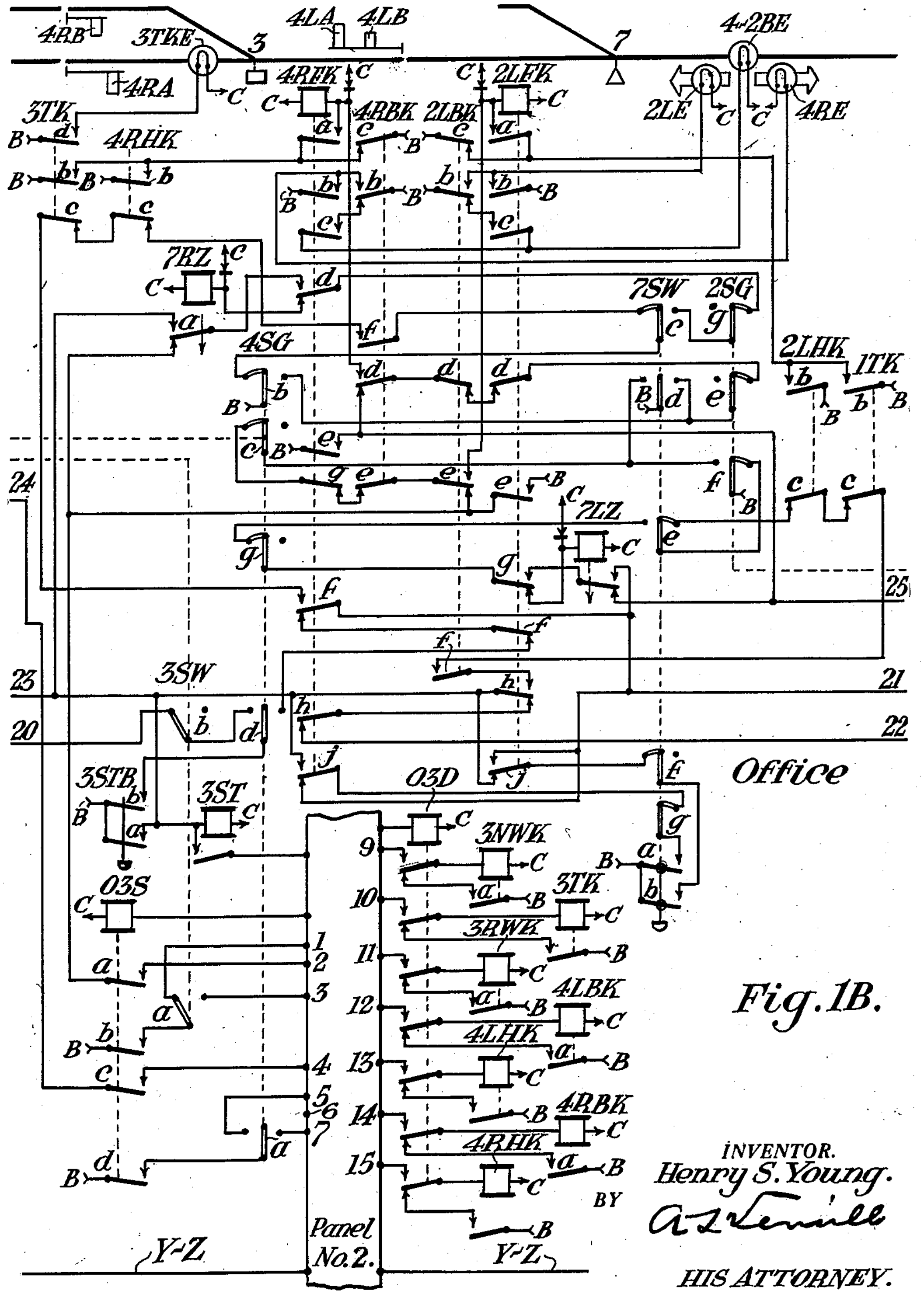

Referring to the accompanying drawings, Figs. 1A and 1B taken together, show the portion of the system located at the control office arranged for the control of the track switches and signals at two field stations at opposite ends of a block, as indicated by the miniature track diagram extending across the top of these views, while Figs. 2A to 2F, inclusive, show a plan of the corresponding stretch of track together with the trackway apparatus and circuits.

Figure 2A:
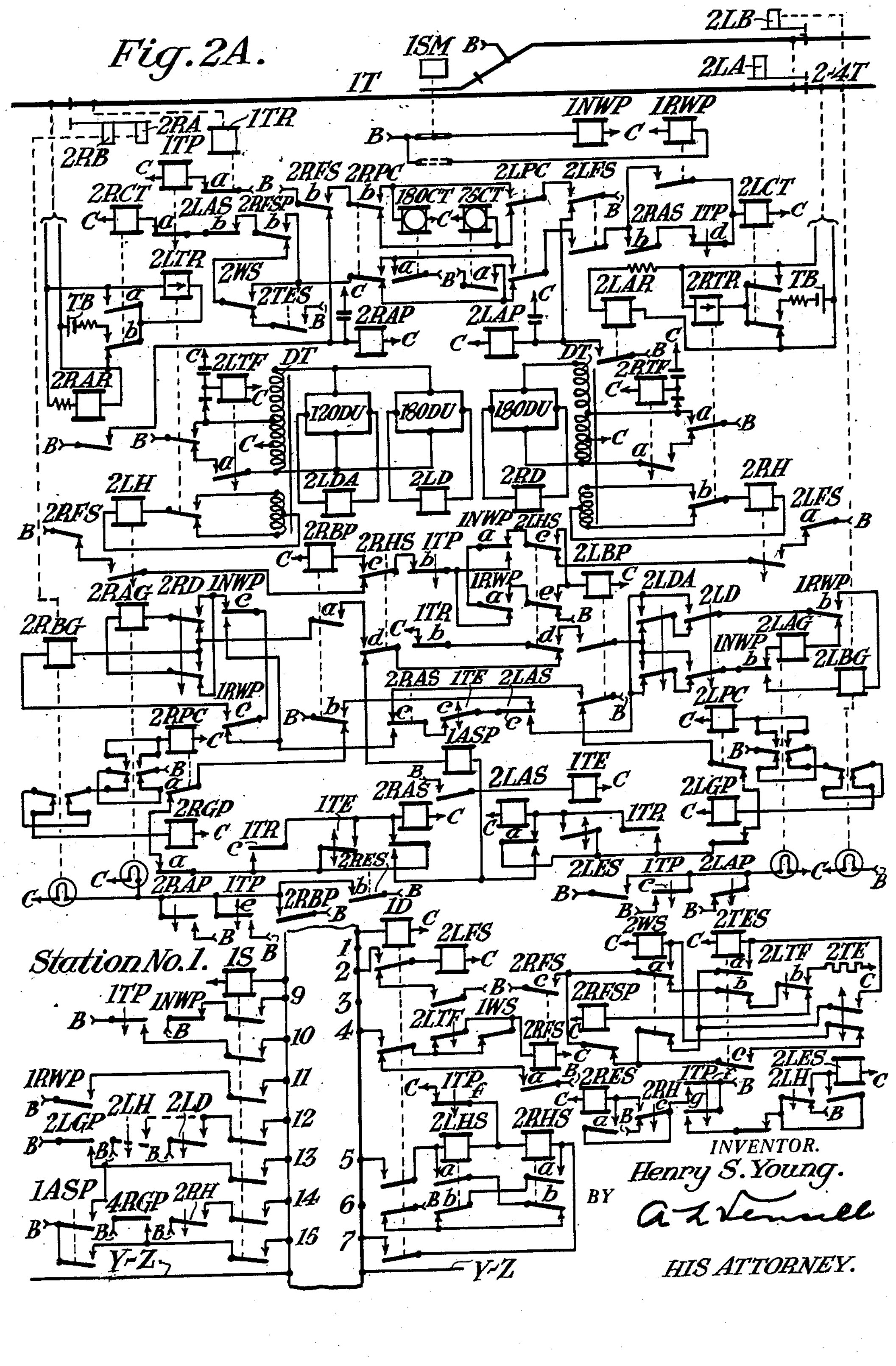
Figure 2B:
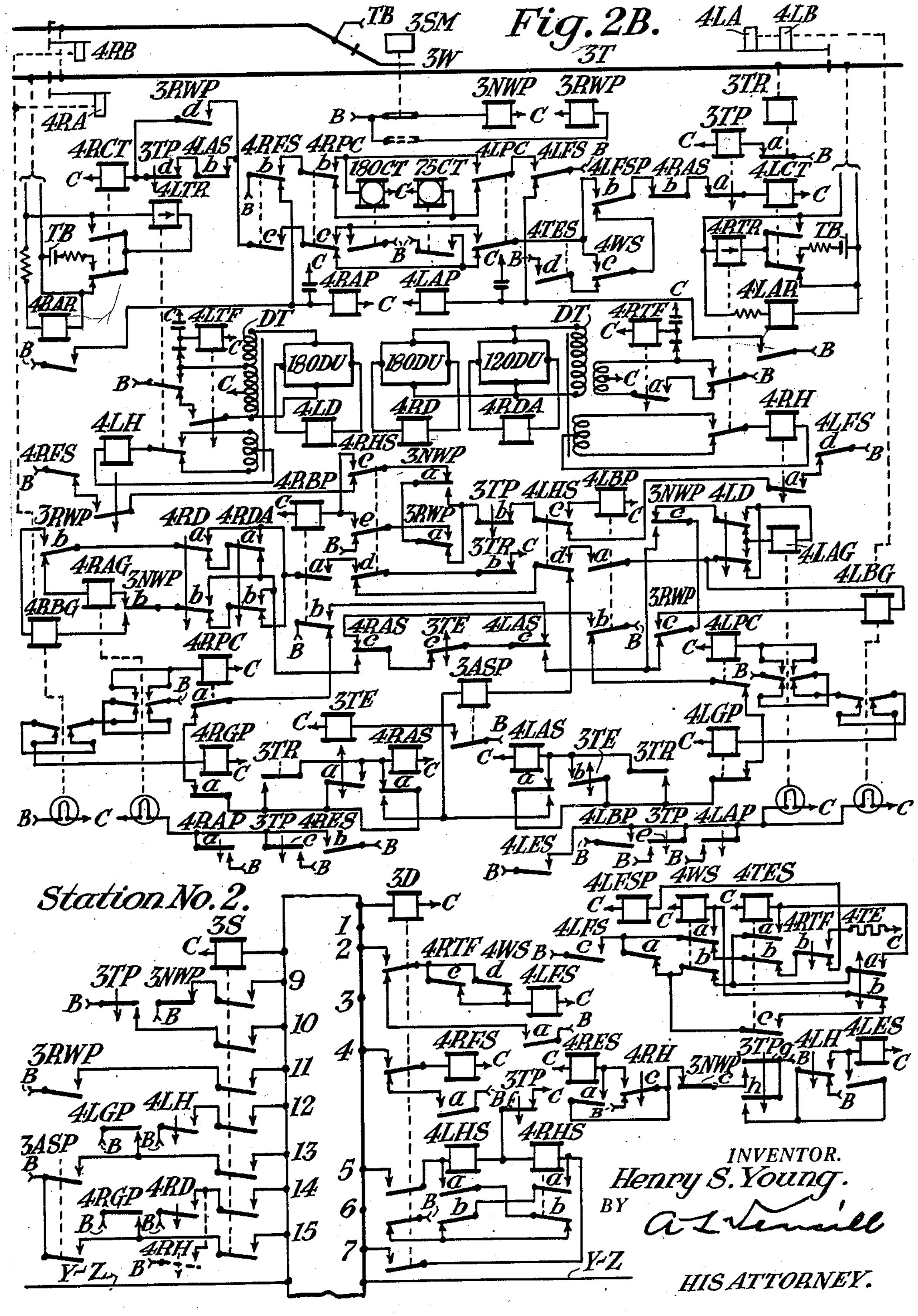

The drawings may be arranged in different ways to illustrate the circuits for different portions of the system. Generally the controlled territory comprises a succession of single track blocks of various lengths connected by passing sidings, in which case the operator's control panel comprises a series of panels, one for each station, corresponding to Figs. 1A and 1B, arranged alternately. These two views, with Fig. 1B at the right of Fig. 1A, illustrate the interconnected office circuits for the control of a typical block containing a passing siding and extending between two opposing signals 2RA and 4LA. The corresponding wayside circuits are shown in Figs. 2A and 2B, by placing Fig. 2B at the right of Fig. 2A.

When Fig. 1A is placed at the right of Fig. 1B, these two views illustrate the office circuits for the control of a single track block extending between the opposing signals 4RA and 2LA. When the block is so short that no intermediate signals are needed, the corresponding wayside circuits are illustrated by placing Fig. 2A directly at the right of Fig. 2B. A longer block having two sets of intermediate signals with an outlying hand throw switch 7W is illustrated by placing Figs. 2B, 2C, 2D, 2E and 2A side by side in order. A block having one set of intermediate signals with a hand throw switch 9W nearby is illustrated by placing Figs. 2B, 2F and 2A side by side in order. The switch lock circuits of Fig. 2D are those used when the distance from the switch to the nearest signal is sufficient to provide the desired minimum approach lighting distance for the signal, while Fig. 2F comprises a modification of Figs. 2D and 2E which is used when the distance to the nearest signal is less than that required for the control of the signal lighting circuits.

Similar reference characters refer to similar parts in each of the views.

To simplify the circuit drawings, only the terminals of the local sources of current for energizing the relays are shown, these being designated by the reference characters B and C, respectively, these local sources as well as the track batteries TB being preferably of the primary battery type. Each track switch and railway signal is identified by a number, the signal designations also including the letter L or R to indicate the corresponding direction of traffic movements to the left or right, respectively. Each relay is identified by a letter or combination of letters, prefixed by the designation of the switch or signal with which it is associated.

The communication system connecting the control office with the stations at the ends of the passing sidings may be of any suitable type and as shown is to be understood to be that described in a publication entitled "Centralized Traffic Control System—Time Code Scheme, Manual No. 504-B," published by The Union Switch and Signal Company, Swissvale, Pennsylvania. This system corresponds generally to that of Letters Patent of the United States No. 2,229,249, issued January 21, 1941, to Lloyd V. Lewis, modified to provide two additional control steps for the control of two traffic directions relays at each station, such as the relays 2LFS and 2RFS of Fig. 2A.

Consideration of the detailed mode of operation of the communication system is not needed for an understanding of my invention, and it is deemed sufficient to point out that coding units are provided at the office and at each field station which are connected by a pair of line wires indicated diagrammatically by the line Y—Z on the drawings, over which codes are transmitted in either direction one at a time for selective communication between the different office panels and the corresponding stations. Each office panel includes a starting relay such as the relay 1ST of Fig. 1A which is energized by the momentary operation of a push button such as 1STB to initiate the transmission of a control code by which a selector relay such as relay O1S at the office and a delivery relay 1D at the corresponding station are selectively energized to temporarily establish a group of seven communication channels, represented herein as a group of wires 1 to 7, inclusive, between the office panel and the selected station. The office panel of Fig. 1A, for example, is associated with a field Station No. 1, shown in Fig. 2A, and it is to be understood that when channels 1 and 3 are extended to Station No. 1 they complete circuits by which the power operated track switch 1W may be operated to normal or reverse under proper traffic conditions to correspond with the position of contact *a* of the switch lever 1SW, Fig. 1A, in the manner shown and described in Patent No. 2,229,249. Channels 2 and 4 are used to control the two direction relays 2LFS and 2RFS already referred to, which relays govern the energization of the coded track circuits for the blocks extending in opposite directions from the station, while channels 5 and 7 govern operation of the two signal control relays 2RHS and 2LHS in accordance with the position of the signal lever 2SG of Fig. 1A, these relays corresponding to the similarly designated relays of the patent. Channel 6 is idle as shown, but in practice is used for the control of a maintainer's call signal or the like.

The initiation of an indication code by the coding unit at a field station results in the temporary energization of a selector relay such as the relay 1S, Fig. 2A, and of a delivery relay such as the relay O1D of the corresponding office panel, to establish another group of seven channels 9 to 15, inclusive, over which a selected group of indication relays K at the office are positioned to correspond with the condition of various relays at the station. Relays 1NWK and 1RWK, Fig. 1A, for example, are controlled over channels 9 and 11, respectively, from Station No. 1, to correspond with the positions of the normal and reverse switch indication relays 1NWP and 1RWP, Fig. 2A, which reflect the position of the track switch 1W, and control the usual switch indication lamps, not shown. Relay 1TK is energized over channel 10 by the release of a repeater relay TP of the track relay 1TR, when the detector section 1T for switch 1W is occupied, to light the "OS" lamp 1TKE in the track diagram. Relays 2LBK and 2RBK are block indication relays. Relay 2LBK is controlled over channel 12 by a relay 2LH or 2LD, Fig. 2A, which is energized when the track sections of the block extending from Station No. 1 to the next station at the left are set up for traffic movements from right to left, and these sections as well as the detector section 3T at the leaving end of each block are all unoccupied. Relay 2LBK controls a direction locking relay 2LFK, Fig. 1B, of the adjoining panel at the left of Fig. 1A. The corresponding relay 4LFK in Fig. 1A is controlled by the block indication relay 4LBK, Fig. 1B, located in the adjoining panel at the right of Fig. 1A, and relay 4LBK is controlled over channel 12 by relay 4LH, Fig. 2B, which is energized when switch 1 is normal and the track sections 1T, 2-4T and 3T of the block extending from Station No. 1 to the next station at the right are set up for traffic movements from right to left and are unoccupied, or when switch 1 is reversed, if sections 2-4T and 3T are unoccupied.

Relay 2RBK, Fig. 1A, is controlled over channel 14 by relay 2RH, Fig. 2A, which is energized when the track sections 1T, 2-4T and 3T of the block extending from Station No. 1 to the next station at the right are set up for traffic movements from left to right and are unoccupied, with switch 3 normal, or if switch 3 is reversed, when sections 1T and 2-4T are unoccupied. Relay 2RBK controls the direction locking relay 2RFK, Fig. 1A. The corresponding relay 4RBK, Fig. 1B, which controls the direction locking relay 4RFK, is controlled over channel 14 by a relay 4RH or 4RD, Fig. 2B, which is energized when the track sections of the block extending from Station No. 1 to the next station at the left are set up for traffic movements from left to right and these sections as well as section 1T are unoccupied.

The relays 2RBK, 2RFK, 4LBK and 4LFK jointly control a directional indicator lamp 2RE or 4LE which is lighted when the trackway system for the corresponding block is set up, and also a block indicator lamp 2-4BE which is lighted when the established block is occupied by a train.

Relays 2LHK and 2RHK are controlled from Station No. 1 over channels 13 and 15, respectively, to indicate the conditions of the signals at Station No. 1, and control the usual indication lamps associated with the signal levers as in Patent No. 2,229,249 hereinbefore referred to. As shown herein, relay 2RHK is energized when signal 2RA or 2RB is cleared, and relay 2LHK when signal 2LA or 2LB is cleared. In addition, both relays 2RHK and 2LHK are energized by the operation of a relay 1ASP to provide a distinctive indication when certain time locking apparatus associated with these signals is in operation.

It will be understood that an indication code is initiated whenever any of the relays which control channels 9-15 changes its position, or if the change occurs when the communication system is in use, as soon thereafter as it becomes available, and also that the same channels 1-7 and 9-15 are used at different times for communication between the office and each of the stations.

The block signals as shown herein are of the well-known searchlight type, each having a three position mechanism identified by the reference character G prefixed by the designation of the corresponding signal as shown in the track plan, by which the signal is caused to indicate caution or proceed when energized in a normal or reverse direction, respectively, and to indicate stop when deenergized. The mechanism for each signal governing high speed movements, such as mechanism 2RAG, Fig. 2A, for signal 2RA, controls a repeating relay such as relay 2RPC for governing the polarity of the current supplied to the mechanism for the distant signal in the rear, and when the two signals at the same location such as signals 2RA and 2RB are both at stop, an indication relay such as relay 2RGP is energized, which relay controls the corresponding signal indication relay 2RHK at the office and also controls an approach locking relay such as relay 2RAS which provides the usual time and approach locking for the associated track switch and for the opposing signals at the opposite end of the block. Each signal having a track circuit in approach thereto is normally dark, and the signal lamp, shown below the corresponding mechanism on the drawings, is lighted by the operation of an approach relay when a train approaches within range of the signal. The approach relay may be connected either in multiple with the track circuit across the track battery TB, as illustrated by relay 2RAR, Fig. 2A, or may be connected in series with the track circuit like relay 6RAR, Fig. 2C.

The trackway system, which I shall now describe in detail, includes continuous track circuits for all main track. The switch sections each have a track relay TR which is steadily energized by a track battery TB. The remaining track circuits in the main track are of the reversible coded type, connected in cascade when the block includes two or more sections. Each coded track circuit has a code following track relay of the biased polar type, such as the relay 2LTR, Fig. 2A, at each end, connected across the track rails over the back contact *b* of a code transmitting relay such as the relay 2RCT, which relay when energized connects a track battery TB across the track rails, but without operating relay 2LTR because of the relative polarity of the connections and because relay 2LTR is shunted by front contact *a* of relay 2RCT. Each code following track relay controls a slow acting repeater relay such as relay 2LTF which relay remains picked up when relay 2LTR is responding to coded current to complete circuits for the usual decoding transformer DT.

When a traffic relay such as relay 2RFS, Fig. 2A, is energized by the central office operator, the closing of its front contact *b* completes an obvious circuit for energizing a code transmitter 75CT or 180CT over contacts of the repeating relay 2RPC for the adjacent signal. The code transmitters are of the pendulum type and each operates continuously when energized. When the detector track section 1T is unoccupied, the closing of contact *a* of the track repeating relay 1TP prepares a circuit for relay 2RCT which is completed periodically over contact *a* of relay 75CT or 180CT and relay 2RCT is thereby caused to supply current interrupted at the 75 code rate to the track rails of the section at the left of signal 2RA when relay 2RPC is released, and at the 180 code rate when relay 2RPC is energized.

In Fig. 2A, the relays 2WS, 2TE and 2TES operate only in connection with electric switch lock control as hereinafter described, and for through traffic control, relay 2RFS energizes a repeating relay 2RFSP over a circuit from terminal B at contact *c* of relay 2RFS, back contact *a* of relay 2WS, back contacts *b* of relays 2TES and 2LTF through relay 2RFSP to terminal C, and when relay 2RFSP is energized, the circuit for relay 2RCT is completed from terminal B at contact *a* of the code transmitter 180CT or 75CT over the front or back contact *c* of relay 2RPC, front contact *b* of relay 2RFSP, contact *b* of the approach locking relay 2LAS for the opposing signals, contact *a* of the repeating relay 1TP for the track relay 1TR through relay 2RCT to terminal C.

Assuming for the present that the single track block in the rear of signal 2RA includes only one coded track section, as illustrated by placing Fig. 2B at the left of Fig. 2A, it will be seen that when this section is unoccupied, the code operation of relay 2RCT is repeated by the track relay 4RTR, thereby energizing relay 4RTF and through the usual decoding transformer DT also energizing the code detector relay 4RH. In addition, a decoding relay 4RD is selectively energized through a resonant decoding unit 180DU when relay 4RTR is operated at the 180 code rate.

If now the operator causes the signal control relay 4RHS to become energized, and if the detector section 3T is vacant, so that relays 3TR and 3TP are energized, and if relay 4RH is also energized, a circuit is completed for energizing a block repeating relay 4RBP, and thereby releasing the approach locking relay 4RAS to lock switch 3W, and depending upon the position of switch 3W, to complete a circuit for energizing mechanism 4RAG or 4RBG to clear signal 4RA or 4RB, and to release the signal indication relay 4RGP.

The circuit for relay 4RBP may be traced from terminal B at back contact *d* of relay 4LFS, shown near the right-hand margin in Fig. 2B, over front contact *a* of relay 4RH, back contact *c* of relay 4LHS, front contact *b* of relay 3TP, contacts *a* of relays 3RWP and 3NWP, front contact *c* or *e* of relay 4RHS through relay 4RBP to terminal C. Relay 4RAS is normally energized over the circuit from terminal B at back contact *b* of relay 4RBP, contacts *a* of relays 4RPC and 4RGP and its own front contact *a* and winding to terminal C, which circuit is opened by relay 4RBP, and is maintained open after the signal clears, by the release of relay 4RGP.

The circuit for mechanism 4RAG extends from terminal B at front contact *b* of relay 4RBP over front contact *c* of relay 4LAS, back contacts *c* of a time element relay 3TE and of relay 4RAS, and thence over contacts *a* of relays 4RDA and 4RD, back contacts *b* of relay 3RWP, mechanism 4RAG, front contact *b* of relay 3NWP, contacts *b* of relays 4RD and 4RDA, contact *a* of relay 4RBP and contact *d* of relay 4RHS to terminal C at contact *b* of the track relay 3TR.

The circuit for mechanism 4RBG differs from that for mechanism 4RAG only in that it is completed over the front contact *b* of relay 3RWP and the back contact *b* of relay 3NWP, as is clear from the drawing.

Considering next the block comprising the main track of the double track stretch, it will be assumed that the traffic relay 4FRS has been energized along with relay 4RHS, so as to set relay 4RCT into periodic operation to supply coded current to the track rails of the section in the rear of signal 4RA. Placing Fig. 2A at the left of Fig. 2B, and assuming that the main track block includes only one coded track section, if this section is unoccupied the code operation of relay 4RCT will be repeated by the track relay 2RTR, energizing relays 2RTF and 2RHR, and when relay 2RTR is operated at the 180 code rate, also energizing relay 2RD. If now the operator causes the signal control relay 2RHS to become energized, if switch 1W is normal and section 1T vacant, the block repeating relay 2RBP becomes energized, thereby releasing the approach locking relay 2RAS to complete a circuit for energizing mechanism 2RAG to clear signal 2RA, and to release the signal indication relay 2RGP, the circuits being generally similar to those associated with signal 4RA as already traced.

For a movement into the passing track of the double track stretch, relay 2RHS is energized with switch 1W reversed, in which case the circuit for the block repeating relay 2RBP includes front contact *a* of relay 1RWP and extends to terminal B at back contact *e* of relay 2LHS, and mechanism 2RBG is energized to condition signal 2RB to indicate caution over circuits which are independent of relays 2RH and 2RD, as shown by the drawing.

Assuming now that the system is set up for a movement from left to right, as above described, it will be seen that when a train passes signal 2RA at clear, entering section 1T, relays 1TR and 1TP release. The opening of contact *b* of relay 1TR releases mechanism 2RAG, causing relay 2RGP to be reenergized. Relays 2RBP and 2RHS are released by the opening of contacts *b* and *f* of relay 1TP, and the closing of back contact *b* of relay 2RBP completes a circuit including contacts *a* of relays 2RPC and 2RGP and contact *c* of relay 1TR to pick up relay 2RAS. Relay 2RHS opens its front contacts *c* and *d* in the circuits for relay 2RBP and mechanism 2RAG, and relay 2RAS opens its back contact *c* in the circuit for mechanism 2RAG, so that signal 2RA remains at stop after section 1T is vacated.

In Fig. 2B, at the right, relay 4RFS stands energized under the condition assumed so that its back contact *b* is open, rendering the energization of the slow release relay 4RAP dependent upon the periodic operation of the code following approach relay 4RAR. Relay 4RAR is connected across the track rails and is supplied with coded current by relay 4RCT, and is so adjusted that the shunting effect of an approaching train causes it to fail to respond to the code when the train comes within range of signal 4RA, whereupon relay 4RAP releases and closes its back contact *a* to light the lamp for signal 4RA. The lamp for signal 4RB is continuously lighted, in view of the fact that no track circuits are provided for the upper passing track.

When the train passes signal 4RA, entering section 3T, relays 3TR and 3TP release and the lamp for signal 4RA is maintained lighted and the lamps for signals 4LA and 4LB become lighted due to the closing of back contacts *c* and *e* of relay TP.

Mechanism 4RAG releases when the train enters section 3T, likewise relays 4RBP and 4RHS, and relays 4RGP and 4RAS become reenergized, over circuits similar to those of Fig. 2B already described. A directional stick relay 4RES also becomes energized at this time over the circuit from terminal B at back contact *g* of relay 3TP, front contacts *c* of relays 3NWP and 4RH through relay 4RES to terminal C. Relay 4RES is held energized over a stick circuit including its own contact *a* and back contact *c* of relay 4RH, and by closing its contact *b* maintains the lamp for signal 4RA lighted as long as the train occupies the block section at the right of section 3T.

In the foregoing I have assumed that the single track block between signals 4RA and 2LA is relatively short and includes only one track section. I shall now consider a longer block comprising three block sections, such as illustrated by interposing Figs. 2C and 2E between Figs. 2B and 2A. In this arrangement, the coded current supplied to the track rails by relay 2RCT at the leaving end of the block is received by the code following track relay 8RTR, Fig. 2E, energizing the slow release relay 8RTF and completing a circuit periodically from terminal B at back contact *a* of relay 8RTR over contacts *a* of relays 8RTF and 8LTF to energize a code following repeating relay 8TP. Contacts *b* and *c* of relay 8RTF complete connections over the contacts of relay 8TP from terminal B to the decoding transformer DT and from the latter to the decoding relay 8RH, whereby relay 8RH becomes energized in response to the code operation of relay 8RTR when the block section at the right of signal 8R is unoccupied. When signal 2RA indicates caption or proceed, relay 2RPC is energized and the frequency of the code supplied to the track rails of this section is shifted from 75 to 180 impulses per minute, in which case relay 8D is selectively energized along with relay 8RH. Relays 8RH and 8D control mechanism 8RG to condition signal 8R to indicate caution in response to the 75 code and to indicate proceed in response to the 180 code, as will be apparent from the drawing.

When relay 8RH is energized, the closing of its front contact *d* energizes the associated code transmitter 180CT, contact *a* of which then operates periodically to energize relay 8RCT to supply current coded at the 180 code rate to the track circuit for the section extending to signal 6R in the rear of signal 8R, to operate the code following track relay 6RTR when this section is unoccupied.

The circuit for relay 8RCT extends from terminal B at contact *a* of the code transmitter 180CT over back contact *e* of relay 8LH, front contact *e* of relay 8RH, front contact *d* of relay 8RFT, back contacts *c* of relays 8RS and 8LS, back contact *d* of relay 8LTF through relay 8RCT to terminal C.

Figure 2C:
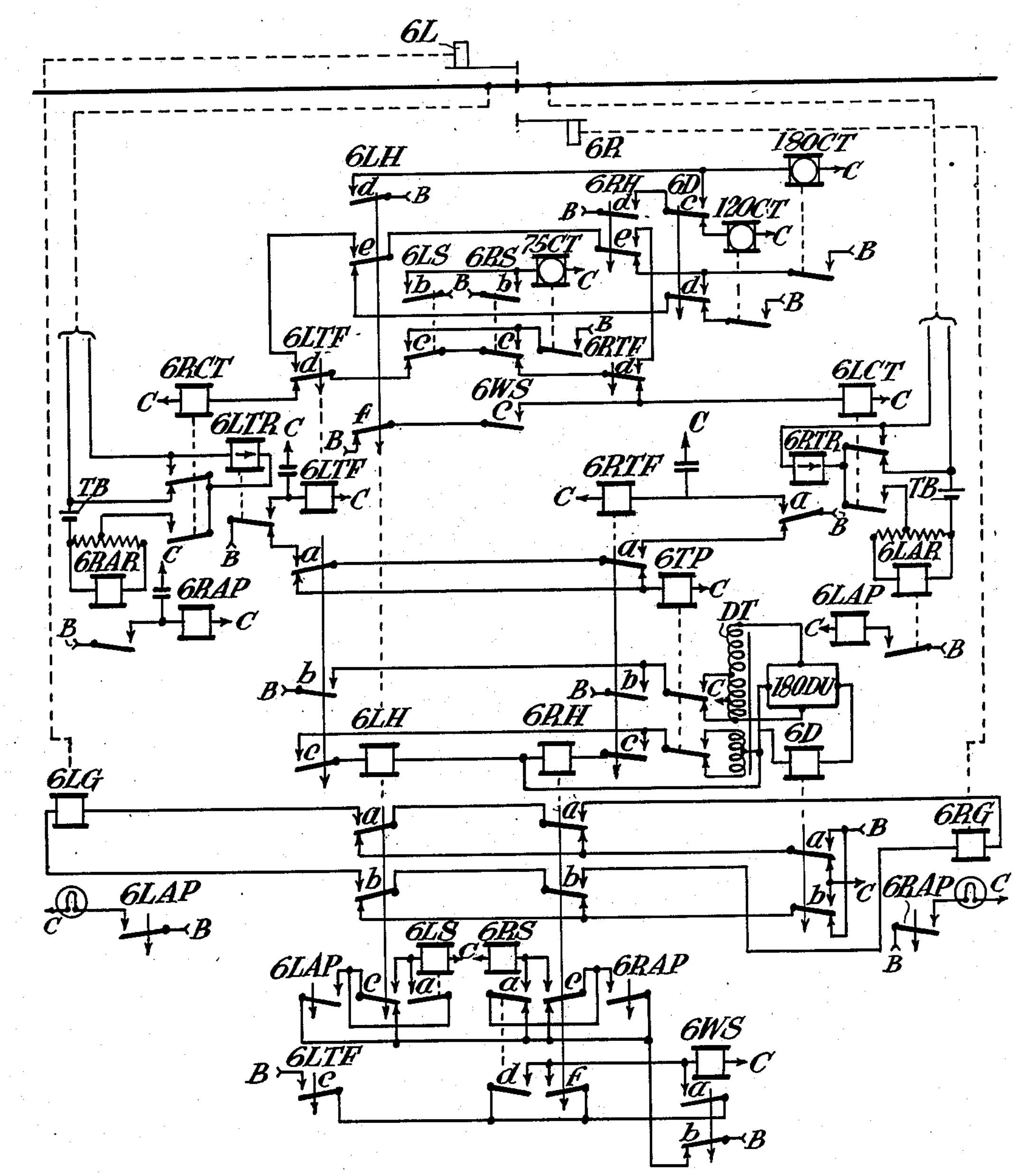
Figure 2D:
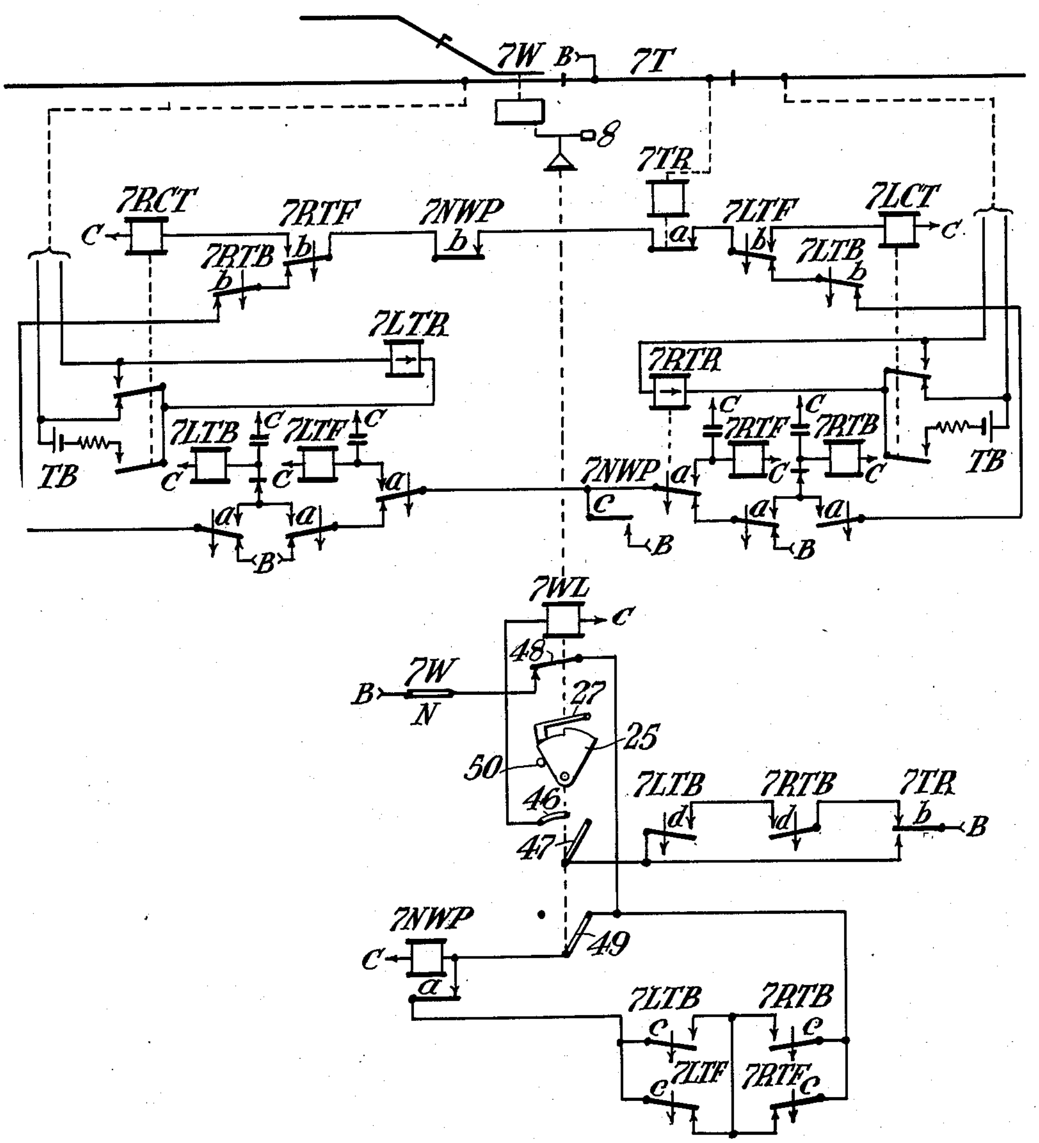

In Fig. 2C, relay 6RTF is energized by relay 6RTR, and relay 6TP responds to the 180 code operation of relay 6RTR to energize relays 6RH and 6D, thereby energizing mechanism 6RG to condition signal 6R to indicate proceed. With relay 6D energized, relay 6RH energizes the associated code transmitter 180CT and causes relay 6RTC to supply 180 code to the section in the rear of signal 6R, over which the track relay 4RTR of Fig. 2B is controlled. If this section is vacant, relay 4RTR is operated at the same rate to energize relays 4RTF, 4RH and 4RD, whereby if section 3T is vacant, signal 4RA or 4RB may be cleared by the operator by energizing the signal control relay 4RHS as already described.

If a train now passes signal 4RA at clear, the signal is returned to stop by the release of relays 3TR and 3TP and relay 3TP releases relay 4RHS, so that the signal remains at stop after the block is vacated.

In Fig. 2C, at the right, the approach relay 6RAR in series with the track battery TB is shunted by a resistor which is so adjusted that relay 6RAR begins to respond to the code operation of relay 6RCT only when the train occupying the section approaches within range of signal 6R. When relay 6RAR begins to operate, relay 6RAP is energized to light the lamp for signal 6R, and if relay 6RH is energized, to cause the directional stick relay 6RS to become energized, relay 6RS energizing the associated code transmitter 75CT.

When the train enters the section at the right of signal 6R, relay 6RH releases to restore signal 6R to stop and to hold relay 6RS energized, and when the train vacates the section in the rear of signal 6R, relay 6RCT supplies coded current thereto to operate relay 4RTR at the 75 code rate, thereby energizing relay 4RH to release relay 4RES and extinguish the lamp for signal 4RA. Relay 6RCT is in this instance energized over front contact c of relay 6RS and the periodically operating contact a of the code transmitter 75CT of Fig. 2C.

As the train proceeds, similar operations occur when the train passes signal 8R. As the train approaches within range of signal 8R the increase in the coded current in the track rails causes relay 8RAR to respond, energizing relay 8RAP to light the lamp for signal 8R and to energize relay 8RS. When the train vacates the section in the rear of section 8R, relay 8RCT supplies current to the section in the rear to operate relay 6RTR at the 75 code rate, thereby energizing relay 6RH and releasing relay 6RS. Since relay 6D is not energized, the code transmitter 120CT of Fig. 2C is operated to cause relay 6RCT to supply current to the section in the rear of signal 6R to operate relay 4RTR at the 120 code rate, thereby energizing relays 4RH and 4RDA. Relay 4RDA serves like relay 4RD to reverse the polarity of the current supplied to mechanism 4RAG or 4RBG but without energizing the block indication relay 4RBK over channel 14, whereby signal 4RA or 4RB may be caused to indicate proceed when signal 6R in advance stands at caution, and signal 8R at stop, with a train in the block section in advance of signal 8R.

When the train vacates the last track section 1T of the block, relay 2RCT is operated at the 75 code rate to condition signal 8R to indicate caution, and relays 8RCT and 6RCT are operated at the 180 code rate to energize relay 6D to condition signal 6R to indicate proceed, and relay 4RD becomes energized to maintain the proceed indication of signal 4RA or 4RB and to initiate the transmission of a block clear indication to the office to energize relay 4RBK.

In the foregoing I have described the operations of the trackway portion of the system with respect to a train movement from left to right from signal 2RA through the block extending to signal 4RA and including the main track of the double track portion, and then through the next block extending from signal 4RA through the single track stretch to the next signal at the right similar to signal 2RA.

I shall now describe the operations of the office apparatus of Figs. 1A and 1B for controlling such a train movement, starting with the apparatus in its normal condition as shown, with Fig. 1B at the right of Fig. 1A.

To clear signals 2RA and 4RA, the operator places the signal levers 2SG and 4SG in their right-hand positions, with the switch levers 1SW and 3SW normal, as shown, and presses the starting buttons 1STB and 3STB. The closing of contact a of each button energizes the associated starting relay 1ST or 3ST to initiate the transmission of a control code in the usual manner.

The operation of each button also closes a second circuit over its contact b to energize the starting relay for the adjoining panel in the direction of traffic movement, that is to say, relay 3ST is energized by the operation of button 1STB, provided that is operated first, and the operation of button 3STB energizes a relay similar to relay 1ST in the next panel at the right of Fig. 1B.

The circuit by which button 1STB controls relay 3ST extends from terminal B at contact b of button 1STB over the right-hand contact d of lever 2SG, contact b of lever 1SW, back contacts f of relays 4LFK and 2RFK, wire 23, through relay 3ST to terminal C. The circuit by which button 3STB controls relay 1ST of the adjoining panel at the right extends from contact b of button 3STB over the right-hand contact d of lever 4SG, back contacts f of relays 2LFK and 4RFK, wire 21 through the next relay 1ST, at the right of Fig. 1B, to terminal C.

Each signal lever in its right-hand position closes a circuit for energizing channel 4 in the adjoining panel at the right. Thus a circuit is closed from terminal B at the right-hand contact b of lever 2SG, normal contact b of lever 1SW, contact e of lever 4SG, back contacts d of relays 4LFK, 4LBK and 2RBK, wire 24, contact c of the selector relay O3S to wire 4, and a circuit is closed from terminal B at the right-hand contact b of relays 4SG, contact e of lever 2SG, back contacts d of relays 2LFK, 2LBK and 4RBK, wire 25 and thence to wire 4 over contact c of the selector relay O1S for the next panel at the right of Fig. 1B.

Thus in response to the operation of the two starting buttons three control codes are transmitted, one to Station No. 1 in which channel 7 is energized over contact d of relay O1S and contact a of lever 2SG to pick up relay 2RHS, one to Station No. 2 in which channels 4 and 7 are energized to pick up relays 4RFS and 4RHS, and one to the next station at the right in which channel 4 is energized to pick up a relay similar to relay 2RFS. In other words, a signal control relay is picked up at the entrance end of each block, and a traffic direction relay is picked up at the next end of each block, which relays function to set up the trackway apparatus as hereinbefore described.

Similar arrangements are provided for controlling traffic movements from right to left, the starting circuits being those including wires 20 and 22. Channel 2 is used to control the traffic direction relays 2LFS and 4LFS, the circuits for energizing these relays being those which extend to terminal B at the left-hand contacts f of the signal levers 4SG and 2SG, respectively.

When the trackway apparatus for a block is set up and the entering signal cleared, an indication code is transmitted, which in the case of signal 2RA, for example, results in the energization of the indication stick relays 2RHK and 2RBK, whereupon a direction locking stick relay 2RFK becomes energized over a branch of the circuit including wires 24 and 4 traced above, extending from terminal B at the right-hand contact b of lever 2SG over front contact d of relay 2RBK. Relay 2RFK is then held energized over a stick circuit extending to terminal B over its own front contact a and front contacts b of relays 2RHK and 1NWK. Wire 24 is maintained connected to terminal B by the closing of contact e of relay 2RBK, and when either relay 2RBK or 2RFK is energized, its front contact b completes a circuit by which the lamp of a direction indicator 2RE is lighted in the track diagram to indicate the direction of traffic established.

The set-up for the block governed by signal 2RA may be cancelled manually while the block is clear, if desired, by returning lever 2SG to normal and transmitting a code to Station No. 1 to put signal 2RA to stop. This results in the transmission of an indication code from Station No. 1 which maintains relay 2RBK energized and releases relay 2RHK, and thereby deenergizes relay 2RFK, but before relay 2RFK releases, a starting circuit is closed momentarily at contact *c* of relay 2RHK over wire 23 to pick up relay 3ST and automatically initiate the transmission of a control code to Station No. 2 in which channel 4 is deenergized, due to the release of relay 2RFK. This code releases the traffic relay 4RFS and restores the trackway apparatus for the block to its inactive condition, the resulting indication code releasing relay 2RBK. The starting circuit referred to extends from terminal B at the center contact *b* of lever 2SG over back contacts *c* of relays 2RHK and 1TK, front contacts *f* of relays 2RBK and 2RFK over wire 23 through relay 3ST to terminal C.

Assuming that the set-up is not cancelled, and that a train governed by signal 2RA enters the block. The release of relay 3TR restores signal 2RA to stop and initiates the transmission of an indication code which causes relay 2RHK to release and relay 2TK to become energized; the closing of contacts *b* and *d* of relay 1TK holds relay 2RFK energized and causes lamp 1TKE to be lighted. A second indication code is initiated by the release of relay 2RH when the train enters the coded track section, which releases relay 2RBK to light the block indicator lamp 2–4BE in the track diagram over back contact *b* of relay 2RBK and front contact *c* of relay 2RFK, and a connection to terminal B at back contact *c* of relay 2RBK holds relay 2RFK energized after section 1T is vacated and relay 1TK released. When the train vacates the last track section 3T of the block, relay 2RH becomes reenergized, causing an indication code to be transmitted to reenergize relay 2RBK, extinguishing lamp 2–4BE. If lever 2SG is still reversed, relay 2RFK is held energized over front contact *d* of relay 2RBK so that the traffic direction remains established, but if lever 2SG has been restored to normal while the block is occupied, relay 2RFK is deenergized by the opening of back contact *c* of relay 2RBK, and the starting circuit from terminal B over the center contact *b* of lever 2SG to wire 23 as traced above is completed momentarily by the closing of contact *f* of relay 2RBK to energize relay 3ST and thereby effect the restoration of the apparatus for the block to its inactive condition in the manner already described.

It will be apparent that the operator may hold the trackway apparatus in its active condition after the block is vacated by leaving lever 2SG reversed, as would be the case if he had reenergized relay 2RHS to cause signal 2RA to clear automatically for a following train as soon as relay 2RH became energized.

The operations resulting from a train movement through the block governed by signal 4RA are similar to those just described, except that in this instance the block indication relay 4RBK is governed by relay 4RD instead of by relay 4RH because the block includes more than one coded track section.

The operations relating to the opposite direction, from right to left, under the control of the head block signals 2LA and 4LA, or the intermediate signals 6L and 8L, are similar to those described and a detailed description is deemed unnecessary, further than to point out certain features relating to the meeting of trains at the passing tracks.

Assume, for example, that the operator wishes to reverse switch 3 and to clear signal 4LB for a train movement into the upper track. This is accomplished by reversing lever 3SW, moving lever 4SG to its left-hand position and then pressing button 3STB to energize relay 3ST and thereby initiate the transmission of a control code to Station No. 2 in which channels 3 and 5 are energized. The circuit for relay 1ST including wire 20 and extending to terminal B at contact *b* of button 3STB is open at contact *b* of lever 3SW, consequently these operations result in the transmission of only one control code. The switch indication relay 3RWK becomes energized and relay 3NWK releases in response to the reversal of switch 3W, and the operator may then clear signal 2RA at the next station at the left, for a movement over the lower track up to signal 4RA, by placing lever 2SG in its righthand position and pressing button 1STB, as hereinbefore described, but in the present case the circuits for relay 2RFK and for energizing channel 4 over wire 24 are completed over contact *c* of relay 3RWK instead of over contact *e* of lever 4SG, the latter contact being open. The circuit for energizing wire 2 over contact *a* of relay O1S which extends to terminal B at contact *f* of lever 4SG is open at contact *c* of lever 3SW, so that relay 2LFS, at Station No. 1, cannot become energized, and consequently the operation of button 1STB results in the transmission of a control code to Station No. 1 by which only relay 2RHS is energized, and of a second code to the next Station No. 2 at the right by which relay 4RFS is energized.

Figure 2E:
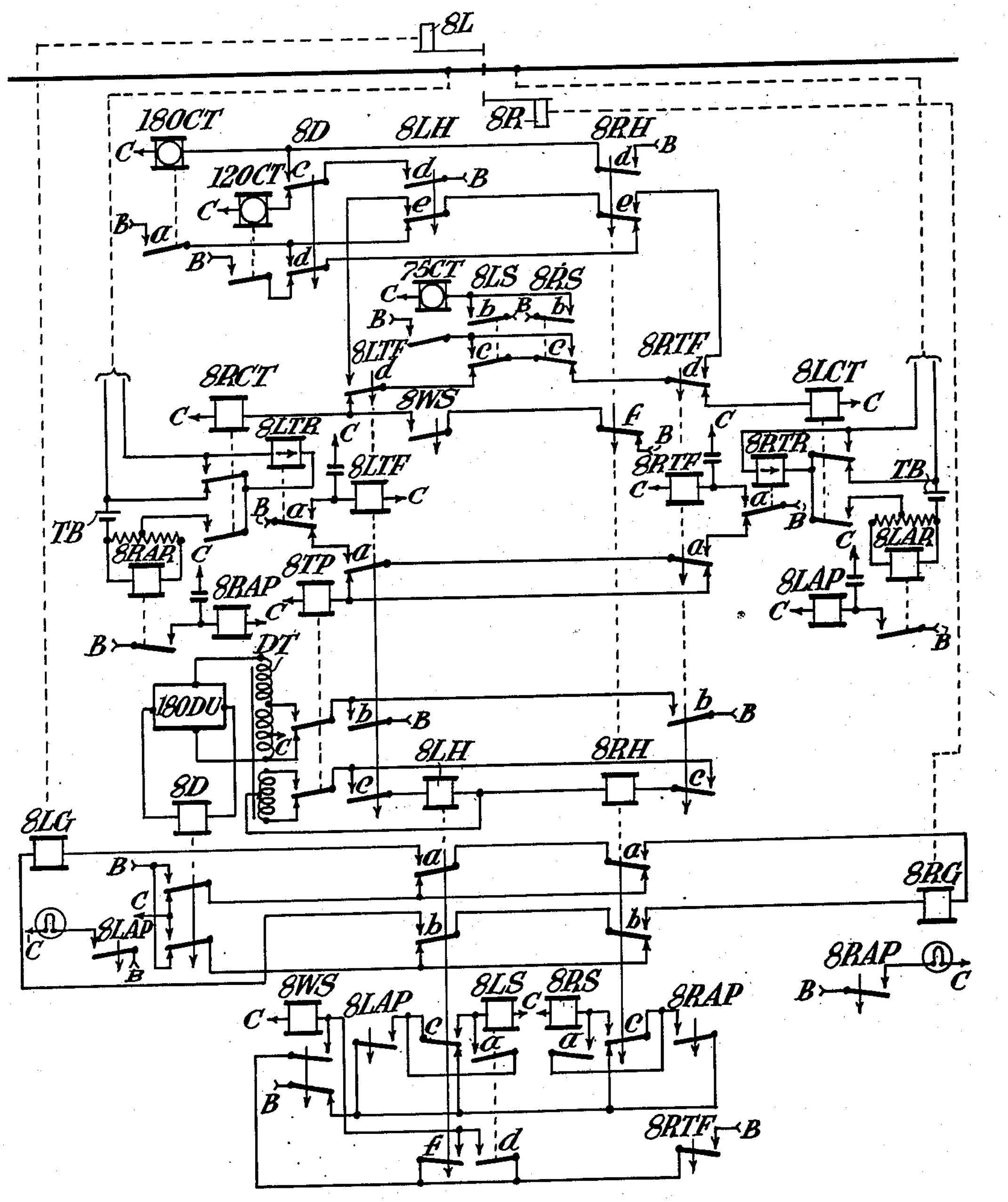

I shall now describe the features of my invention relating to the locking of outlying hand throw switches, as illustrated in Fig. 2D, and shall assume that this view is interposed between Figs. 2C and 2E in the circuits for the single track block.

Fig. 2D includes cut section apparatus by which a short detector track section 7T adjacent the hand throw switch 7W and having a steadily energized track relay 7TR is interposed in the track circuit system. Assuming, for example, that the code following track relay 7RTR is operated by coded current received over the rails of the track section at the right, a front contact repeating relay 7RTF is energized and also a back contact repeating relay 7RTB to complete circuits whereby relay 7RCT is caused to repeat the code into the track section extending to the left, provided the corresponding relays 7LTF and 7LTB for the opposite direction are deenergized.

The circuits for relays 7RTF, 7RTB and 7RCT extend from terminal B over back contacts *a* of relays 7LTF and 7LTR and front contact *a* of relay 7RTR through relay 7RTF to terminal C, over back contact *a* of relay 7RTR and front contact *a* of relay 7RTF through relay 7RTB to terminal C, and over front contact *a* of relay 7RTB, back contacts *b* of relays 7LTB and 7LTF, front contacts *a* of relays 7TR and 7NWP, front contact *b* of relay 7RTF through relay 7RCT to terminal C. Relay 7NWP is an indication relay for switch 7W which is energized when the switch and its electric lock are locked normal.

The electric lock may be of the type shown in Letters Patent of the United States No. 1,126,834, granted February 2, 1915, to Walter P. Neubert and William E. Smith, and serves to lock the operating lever 8 for the switch in its normal position by a latch attached to segment 25 which is held in locking position by the bail 50 of a padlock. To unlock the switch for a movement into the side track, the train must occupy section 7T so as to release the track relay 7TR, and the padlock must be removed by the train crew and the segment 25 moved to the position in which it is stopped by the locking dog 27. In this position, a circuit is closed from terminal B over back contact *b* of relay 7TR, contacts 47—46 through magnet 7WL to terminal C, energizing the magnet to lift the locking dog 27, and to open contact 48 to release the indicating relay 7NWP, and permitting segment 25 to be moved to its full reverse position in which lever 8 is free to be operated to reverse the switch.

For movements out of the side track, cooopera- tion with the central office operator is required, and the traffic control system must be set up for the block which the train is to enter, in a special manner, as already pointed out herein, so as to enable coded current to be received at the switch location from both directions. Assuming that the direction in which the train is to move, after it enters the block is from left to right, the reception of coded current at the switch location from the right indicates that the portion of the block at the right of the switch is either unoccupied, or that the direction of movement of a train in that portion is away from the switch. In the latter case, the current received from the right is provided by energizing a directional stick relay, such as relay 8RS, Fig. 2E. The current received from the left at the switch location is provided by energizing a stick relay 4WS, Fig. 2B. Relay 4WS is energized by operating the entrance end traffic relay 4LFS to its exit end position, while coded current is being received at the left-hand end of the block, and becomes energized following an operation of relays 4TE and 4TES by which steady current is supplied to the rails for a time sufficient to terminate the transmission of coded current from right to left over the rails of the sections at the left of the switch. For the control of this train movement a three position lever 7SW, Fig. 1B, is provided, of the push-turn type having two auxiliary "push" contacts *a* and *b* which close momentarily when the lever is rotated. But one switch lock lever is required for each block containing a hand throw switch even though the block contains a number of switches at different locations in the block.

To unlock a switch for a movement out of the side track, when the system is in its normally deenergized condition, as shown, the operator moves lever 7SW to the left or right, preferably in the direction the train is to move, in response to a request from the train crew, and they remove the padlock bail 50 so as to open contact 49 and to close contacts 47—49, relay 7NPW being then held energized over a stick circuit as shown.

The operation of lever 7SW to the right, with the signal levers 2SG and 4SG normal, energizes relay 7RZ and also initiates the transmission of a control code to Station No. 1 at the right-hand end of the block to pick up relay 2RFS, and thereby set up the track circuit system so as to energize relays 4RTF, 4RH, and 4RD at the left-hand end, provided the block is unoccupied.

Relay 7RZ is energized over the circuit from terminal B at the center contact *b* of lever 4SG, right-hand contact *c* of lever 7SW, contact *g* of lever 2SG, back contact *d* of relay 4RFK through relay 7RZ to terminal C.

Relay 1ST is energized over the circuit from terminal B at contacts *a* and *g* of lever 7SW, back contact *j* of relay 4RFK, wire 21 through relay 1ST to terminal C, to initiate the code, and channel 4 is energized to pick up relay 2RFS over the circuit from terminal B over the right-hand contact *d* of lever 7SW and contact *e* of lever 2SG, back contacts *d* of relays 2LFK, 2LBK and 4RBK, and thence, as already traced, over wire 25, contact *c* of relay O1S to wire 4.

When the energization of the track circuit system by relay 2RFS is completed, relay 4RD picks up, initiating an indication code which picks up relay 4RBK, thereby lighting the direction indicator lamp 4RE, and relay 4RFK picks up over front contact *d* of relay 4RBK which is now connected to terminal B at the right-hand contact *d* of lever 7SW.

The opening of back contact *d* of relay 4RFK deenergizes relay 7RZ but before relay 7RZ releases, relay 3ST is picked up over front contact *d* of relay 4RFK and front contact *a* of relay 7RZ to initiate the transmission of a control code to Station No. 2, at the left-hand end of the block.

This circuit for relay 3ST extends from terminal B at the center contact *b* of lever 4SG over the right-hand contact *c* of lever 7SW, center contact *g* of lever 2SG, front contact *d* of relay 4RFK, front contact *a* of relay 7RZ, through relay 3ST to terminal C. When relay 7RZ releases, this connection from terminal B is extended over the back contact *a* of relay 7RZ and front contact *a* of relay O3S to wire 2, to pick up relay 4LFS, at Station No. 2.

Since under the assumed conditions relay 4RTR, Fig. 2B, is now being operated by coded track circuit current, relay 4RTF occupies its energized position and when relay 4LFS picks up, the thermal relay 4TE is energized in place of relay 4LFSP, over the circuit from terminal B at contact *c* of relay 4LFS, back contact *a* of relay 4WS, back contact *b* of relay 4TES, front contact *b* of relay 4RTF through relay 4TE to terminal C. Relay 4TE opens its contact *b*, and after an interval of several seconds closes its contact *a* to energize relay 4TES over back contact *a* of relay 4LFSP, and back contact *b* of relay 4WS. Relay 4TES picks up, completing a stick circuit at its contact *a* and deenergizing relay 4TE, and closing a circuit from terminal B at contact *d* of relay 4TES over back contact *e* of relay 4WS, contacts *b* of relays 4LFSP and 4RAS, contact *a* of relay 3TP through relay 4LCT to terminal C.

Relay 4LCT therefore becomes steadily energized, deenergizing relays 4RTR, 4RTF, 4RH and 4RD, and supplying steady current to the track rails extending to the right. Relay 4RD upon releasing initiates an indication code which releases relay 4RBK to light the block indicator lamp 4-2BE, relay 4RFK being held energized over back contact *c* of relay 4RBK.

Placing Fig. 2C at the right of Fig. 2B, it will be seen that the steady current received over the track rails from the left will energize relay 6LTR, during the first off period of the code supplied to this section by relay 6RCT. Relay 6LTF thereupon picks up and opens the circuit for relay 6RCT to prevent its further operation. Relay 6WS picks up over the circuit from terminal B at contact *e* of relay 6LTF, contact *f* of relay 6RH through relay 6WS to terminal C, and its contact *b* opens the stick circuit for the directional stick relay 6RS. It follows that if relay 6RS is energized, it will be released by relay 6WS and will not interfere with the subsequent code operation of relay 6LCT. Relay 6WS is held energized over the stick circuit including its own contact *a* and contact *e* of relay 6LTF, and relay 6LCT becomes steadily energized over the circuit from terminal B at back contact *f* of relay 6LH, contact *c* of relay 6WS through relay 6LCT to terminal C, thereby deenergizing relays 6RTR, 6RTF, 6RH and 6D and supplying steady current to the rails of the track section extending to Fig. 2D at the right At the switch location, Fig. 2D, the steady current received over the track rails of the section at the left energizes relay 7LTR during the first off period of the code supplied to this section by relay 7RCT, and the opening of back contact *a* of relay 7LTR opens the circuits for relay 7RCT, 7RTF and 7RTB so that relay 7LTR remains steadily energized, relay 7RCT remains released, and relays 7RTF and 7RTB release. When relay 7RTF releases, relay 7LTF becomes energized, and by opening its back contact *c*, releases relay 7NWP, since as assumed, contact 49 is now open.

In the event that the operations being described are intended for the release of the electric lock for another track switch in the same block but at the right of switch 7W, the bail 50 of the padlock for switch 7W would not have been removed and contact 49 would be closed and relay 7NWP would remain energized, in which case the energization of relay 7LTF would complete a circuit from terminal B at back contact *a* of relay 7LTB over contacts *b* of relays 7RTB, 7RTF and 7NWP, contact *a* of relay 7TR, front contact *b* of relay 7LTF through relay 7LCT to terminal C, so that relay 7LCT would become energized to apply steady current to the track rails extending to the right.

At the location where contact 49 has been opened by the train crew, this being the one shown in Fig. 2D as assumed, relay 7NWP releases, and the steady current impulse is not transmitted further because the circuit for relay 7LCT is opened at contact *b* of relay 7NWP. Relay 7RTR therefore continues to respond to the code received from the right and since relay 7LTR is steadily energized, relays 7LTF, 7RTF and 7RTB are energized over the connection to terminal B at back contact *c* of relay 7NWP.

After steady current has been supplied to the track rails as above described for a time corresponding to the cooling period of relay 4TE, Fig. 2B, contact *b* of relay 4TE closes to pick up relay 4WS, and the closing of front contact *c* of relay 4WS connects relay 4LCT to the contact of the associated code transmitter 75CT or 180CT to cause coded current to be supplied to the track rails at the left-hand end of the block.

In Fig. 2C, relay 6LTR responds to the coded current received from the left and sets relay 6TP into operation, energizing relay 6LH to clear signal 6L, and to connect relay 6LCT to the contacts of the adjacent code transmitter 180CT to supply coded current to the track rails extending to Fig. 2D at the right, where relay 7LTR responds to this coded current and energizes relay 7LTB along with relay 7LTF.

The lock magnet 7WL becomes energized when coded current is received from both ends of the block, over the circuit from terminal B at front contact *b* of relay 7TR over contacts *d* of relays 7RTB and 7LTB and contacts 46—47, lifting the locking dog 27 to unlock the switch lever 8.

When the switching is completed, with the train occupying the main track ready to proceed in the established direction, which is toward the right under the conditions assumed, the operator is advised by the train crew that switch 7W is locked normal and he then restores lever 7SW to its normal center position, completing a circuit in Fig. 1B momentarily from terminal B over contacts *a* and *g* of lever 7SW, front contact *j* of relay 4RFK through relay 3ST to terminal C, energizing relay 3ST to transmit a control code to the left-hand end of the block in which channel 2 is not energized. Relay 4LFS is released by this code, deenergizing the coded track sections in the rear of the train.

Since signal 8R has been cleared, as the train proceeds, relay 8RS will become energized to supply 75 code to the section in the rear of signal 8R to condition signal 6R to indicate caution, causing 120 code to be supplied to the section in the rear of signal 6R to energize relays 4RH and 4RDA to permit signal 4RA to be cleared for a following train.

When the block is vacated, relay 4RD becomes energized in place of relay 4RDA to transmit a block clear indication to the office to energize relay 4RBK, which operates to restore the system to its inactive condition as hereinbefore described.

It may be that an unlock is requested by the crew of a train at switch 7W when the trackway system is set up and the block is occupied by a main line train which has passed the switch location, moving from left to right, for example.

In this case relay 4RFK is energized, and the movement of the switch lever 7SW to its right-hand position results in the transmission of only one code, namely, to Station No. 2 at the left-hand end of the block, the circuit by which relay 1ST is energized by operation of lever 7SW being open at back contact *j* of relay 4RFK.

When the main line train is between signals 6R and 8R, relay 6RS is energized, and if at this time steady current is supplied to the rails of the section in the rear to pick up relay 6LTF, relay 6WS will pick up the circuit extending from terminal B at contact *e* of relay 6LTF over contact *d* of relay 6RS, through relay 6WS to terminal *c* and relay 6RS will then release, due to the opening of back contact *b* of relay 6WS. Relay 6LCT therefore operates as already described to supply steady current, followed by code, to the rails of the section at the right to pick up relay 7LTR, and eventually relay 7LTB, provided the portion of the block at the left of switch 7W is vacant. In the portion at the right of the switch, relay 8RS will be energized by the main line train to supply 75 code to the section in the rear of signal 8R to energize relay 7RTB, so that switch 7W may be unlocked as soon as the main line train has passed signal 8R and vacated the section in the rear of that signal.

In the foregoing examples, it has been assumed that the train which has entered the main line via switch 7W is to proceed in the established direction of traffic, but it may be desired to have this train move in the opposite direction. This is permissible, since the clearing of signal 6L as well as that of signal 8R has been effected as the result of the movement of the switch lever 7SW to its right-hand position.

When an against-traffic move is to be made, the operator holds lever 7SW reversed until he knows that the train has passed the intermediate signals such as signal 6L, as indicated by the lighting of lamp 3TKE, for example. When the train moving toward the left passes signal 6L, relay 6LTR is shunted and its code operation ceases, releasing relay 6LTF which in turn releases relay 6WS. Relay 6WS is slow to release and the closing of its back contact *b* in the circuit for the directional stick relay 6LS is thereby delayed sufficiently to prevent the energization of relay 6LS, so that coded energy is not supplied to the left-hand end of the section in the rear of signal 6L when this section is vacated, to conflict with that supplied to the block at the right-hand end by relay 7RCT.

It follows that when the train moving toward the left vacates the section at the rear of signal 6L, relay 6RTR responds to the coded current supplied by relay 7RCT to cause relay 6RCT to supply coded current to the section in the rear of signal 6R, and to energize relays 6RH and 6D to clear signal 6R in the rear of the train.

When the train moving toward the left enters section 3T, the release of relays 3TR and 3TP stops the code operation of relay 4LCT. If the operator does not now restore lever 7SW to normal to initiate the restoration of the system to its normal inactive condition, relay 4RTR will respond to the coded current received over the track rails from the right, when the rear of the train passes signal 4LA, to energize relay 4RTF, and the stick circuit for relay 4LFS will then be opened at back contact *c* of relay 4RTF, since back contact *d* of relay 4WS, in parallel therewith, is open. Relay 4LFS therefore releases and in turn releases relay 4WS, which prevents further operation of relay 4LCT. Relay 4RTR responds to the code received from the rails of the section at the right, and energizes relay 4RD to initiate the transmission of a block clear indication code to the office, and the system is thus left in the same condition as when a signal lever is left reversed after the train vacates the block.

When the switch lock circuits of Fig. 2D are interposed between Figs. 2C and 2E as above described, it will be seen that the lighting circuit for signal 8R or 6L will not become closed until an approaching train has passed the location of switch 7W, and consequently these circuits are suitable for use only when the coded track section between the switch location and the nearest signal is of sufficient length to provide the desired approach lighting distance.

When the hand throw switch is a relatively short distance from a signal, it is desirable to extend the approach lighting control limits for the signal into the coded track section beyond the switch. In this case the approach control is repeated over the coded track section between the switch and the nearby signal by employing a reverse feed back code in that section, as illustrated more particularly in Fig. 2F.

Figure 2F:
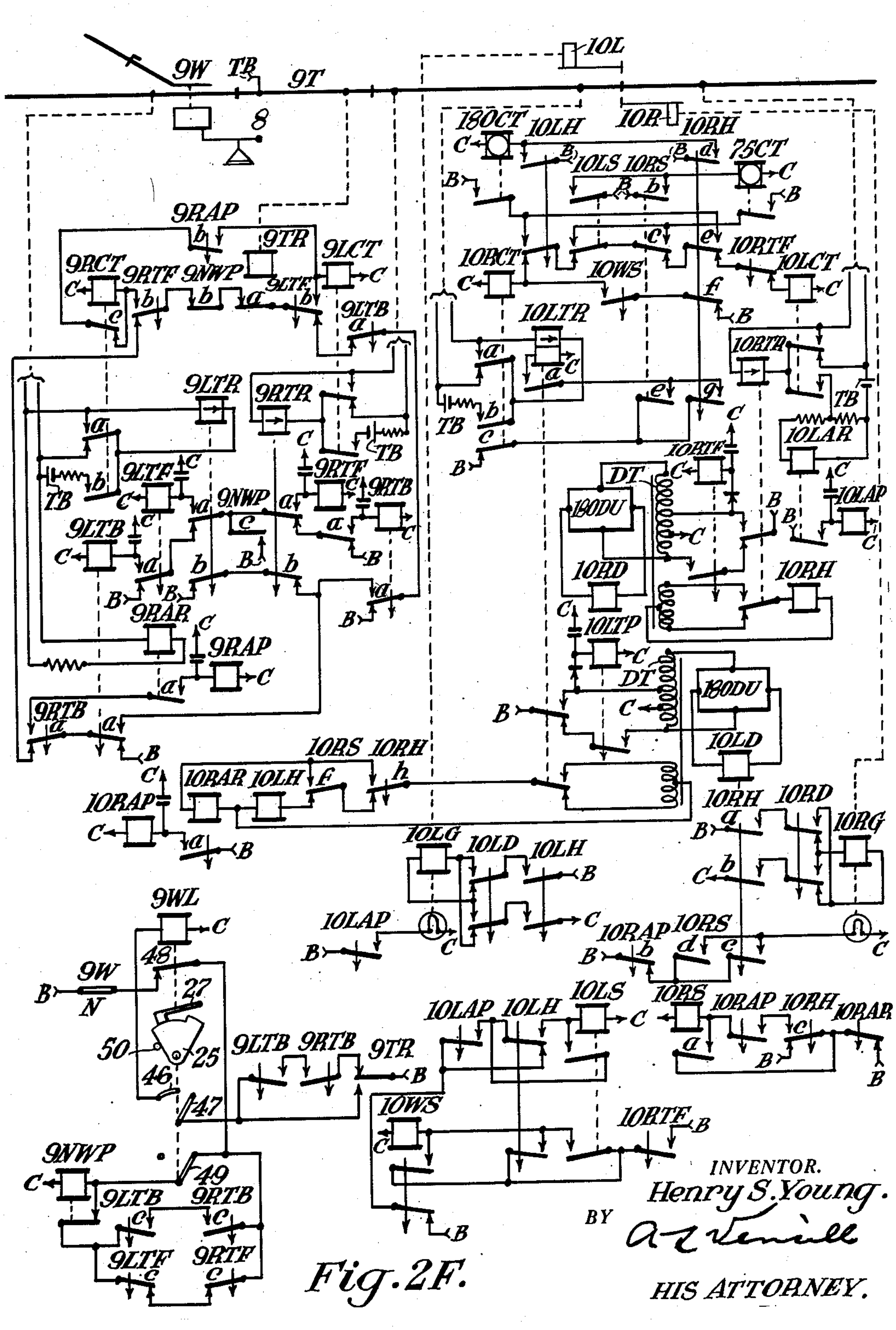

In Fig. 2F, the hand throw switch 9W is assumed to be a relatively short distance from the signals 10L and 10R, and for simplicity it will be assumed that Fig. 2F is located between Figs. 2B and 2A to illustrate the circuits for a single track block containing but one pair of intermediate signals 10L and 10R, the corresponding office circuits being those of Figs. 1B and 1A as in the preceding example, with the electric switch lock for switch 9W controlled by lever 7SW, since but one switch lock lever is required per block, as already pointed out.

Assuming first that the operator moves lever 4SG to the right and presses the starting button 2STB to effect the clearing of signal 4RA for a through train movement through the block illustrated by Figs. 2B, 2F and 2A, control codes will be transmitted as hereinbefore described to energize relay 4RHS at the left-hand or entrance end, and to also energize relay 2RFS at the right-hand or exit end, relay 2RFSP becoming energized and setting relay 2RCT into operation to supply coded current to the track rails at the right-hand end.

In Fig. 2F, the code following track relay 10RTR responds, energizing the repeating relay 10RTF and the code detector relay 10RH in the normal manner. Relay 10RH completes circuits for mechanism 10RG for clearing signal 10R, and energizes the code transmitter 180CT to cause relay 10RCT to supply coded current to the rails of the short section in the rear of signal 10R to which the track relay 9RTR at the switch location responds.

Relay 9RTR energizes the slow release relays 9RTF and 9RTB over its contact *a*, and operates relay 9RCT by the periodic closing of its back contact *b* to repeat the code in the section at the left of switch 9W, provided the switch indication relay 9NWP and the track relay 9TR are energized, so that relay 4RTR in Fig. 2B is supplied with coded current to effect the clearing of signal 4RA in the usual manner.

The circuit for relay 9RCT extends from terminal B at back contact *b* of relay 9LTR over back contact *b* of relay 9RTR, front contact *a* of relay 9RTB, back contacts *b* of relays 9LTB and 9LTF, front contact *a* of relay 9TR, front contacts *b* of relays 9NWP and 9RTF through relay 9RCT to terminal C. The approach relay 9RAR is connected across the track rails of the section to which code is being supplied by relay 9RCT, and is adjusted like relay 4RAR so that unless it is shunted by an approaching train within range of the signal in advance, which in this instance is signal 10R, relay 9RAR responds to the code and energizes the slow release relay 9RAP, the circuit for relay 9RAP extending from terminal B at back contact *a* of relay 9LTB over front contacts *a* of relays 9RTB and 9RAR through relay 9RAP to terminal C. By closing its front contact *b*, relay 9RAP prepares a circuit over which relay 9LCT is energized momentarily, in parallel with relay 9RCT, each time relay 9RTR releases. Each energization of relay 9LCT is of brief duration because its circuit is opened at back contact *c* of relay 9RCT as soon as relay 9RCT picks up. Relay 9LCT therefore supplies a brief "feed back" impulse to the rails of the section extending to signal 10R, during each interval between the impulses of the code supplied thereto by relay 10RCT, to energize relay 10LTR, which relay is then held energized locally for the remainder of such interval over a local stick circuit from terminal B at back contact *c* of relay 10RCT, contact *g* of relay 10RH, or contact *e* of relay 10RS, and contact *a* and the lower winding of relay 10LTR to terminal C. The closing of front contact *h* of relay 10RH or of front contact *f* of relay 10RS connects relay 10RAR to the decoding transformer associated with relay 10LTR, in place of relay 10LH, so that relay 10RAR and its repeating relay 10RAP become energized when relay 10LTR is operated by feed back impulses. When a train approaching switch 9W from the left reaches a point where the resistance of the shunt comprising its wheels and axles and the rails of the intervening track is reduced so that relay 9RAR fails to respond to the code supplied by relay 9RCT, relay 9RAP releases to stop the transmission of feed back impulses over the rails of the section in advance, thereby releasing relays 10RAR and 10RAP, the lamp for signal 10R becoming lighted when back contact *b* of relay 10RAP closes. The approach lighting distance for signal 4R therefore extends to a point at the left of switch 9W determined by the adjustment of relay 9RAR.

With respect to train movements in the opposite direction, from right to left, the operation of the apparatus of Fig. 2F is similar to that of Figs. 2D and 2E as already described.

I shall now assume that the operator wishes to permit a train to enter the main track via switch 9W, and so moves the switch lever 7SW to its right-hand position to set up the direction for movements toward the right as already described in connection with the control of switch 7W. In the present example, the trackway circuits as shown in Figs. 2B, 2F and 2A will be set up in the same manner as for clearing signal 4RA, but since the signal lever 4R has not been reversed, the receipt of a block clear code at the office in response to the energization of relay 4RD results in the transmission of a control code to the entrance end to energize relay 4LFS, which code finds relay 4RTF energized and so energizes relays 4TE and 4TES to apply steady current temporarily to the track rails at the left-hand end of the block, releasing relay 4RD to transmit a block occupied code to the office.

In Fig. 2F, relay 9LTR is energized by the current received from the left during the first off period of the code delivered by relay 9RCT, and relay 9RCT remains released due to the opening of back contact *b* of relay 9LTR, which also prevents further transmission of feed back impulses by relay 9LCT, thereby releasing relay 10RAR to cause signal 10R to become lighted and to energize the directional stick relay 10RS. Since back contact *a* of relay 9LTR is also open, relays 9RTF and 9RTB release and relay 9LTF becomes energized and by opening its back contact *c*, releases relay 9NWP, assuming as in the preceding example, that the crew of the train at the switch have removed the padlock bail 50 and thereby opened contact 49.

Terminal B at back contact *c* of relay 9NWP becomes connected to the circuits for relays 9RTF and 9RTB so that these relays become energized in response to the continued operation of relay 9RTR.

In Fig. 2B, relay 4WS picks up after a short time to cause relay 4LCT to supply coded current to the track at the left-hand end of the block, as already described, to cause relay 9LTR to operate periodically and energize relay 9LTB, along with relay 9LTF, the lock magnet 9WL becoming energized when relays 9LTB and 9RTB are both energized to indicate the reception of coded current from both ends of the block. Since relay 10RAP has been released, if the train entering the main line moves in the established direction, toward the right, it finds signal 10R lighted to display its proceed or caution indication.

When the operator is advised by the train crew that switch 9W has been locked normal, he restores lever 7SW to normal, thereby transmitting a control code to release relay 4LFS and thereby deenergize the coded track circuits in the rear of the train, and since relay 10RS is energized, 75 code will be supplied to these sections by relays 10RCT and 9RCT as soon as section 9T is vacated, so that signal 4RA or 4RB may be cleared for a following train.

If the train moves toward the left, against the established direction of traffic, the operator leaves the switch lever 9SW reversed until the block is vacated. Relay 9RAR responds to the code supplied to the track in the rear of the train to reenergize relay 10RAR, thereby releasing relay 10RS, and the system is then restored to normal in the manner hereinbefore described in connection with switch 7W.

The circuits of Fig. 2F involved in the operation of the system for traffic movements from right to left function like the corresponding circuits of Figs. 2D and 2E, and a detailed description thereof is deemed unnecessary.

In the foregoing, I have described a centralized traffic control system embodying my invention in connection with a system of reversible circuits employing the track rails as the conductors over which the signals are controlled. It will be understood that these conductors may also be line wires in which case the circuits would include front contacts of normally energized track relays, a suitable arrangement being shown, for example, in my Letters Patent of the United States No. 2,326,991, issued August 17, 1943, for Railway Traffic Controlling Apparatus.

Although I have herein shown and described only one form of railway traffic controlling apparatus embodying my invention together with modifications thereof as applied to different situations, it is understood that various changes and modifications may be made therein within the scope of the appended claims without departing from the spirit and scope of my invention.

Having thus described my invention, what I claim is:

1. Railway traffic controlling apparatus for governing the operation of railway signals located at opposite ends of a stretch of single track, comprising a normally deenergized system of reversible circuits extending the length of the stretch which is arranged to be energized at either end to control the signal at the other end in accordance with traffic conditions in the stretch, a signal lever for each signal located at a central office for imposing manual control upon the signals, signal indication means at the office controlled by said signals to indicate their condition, two block indication relays at the office controlled by said system of circuits from the opposite ends of the stretch, two direction locking relays, one controlled by each block indication relay, indication means controlled by said direction locking relays to indicate, when a selected traffic direction is established, whether the stretch is occupied or clear, a remote control system having a manually controllable starting button for each signal lever, two starting circuits controlled by each starting button for initiating the transmission of two control codes by said remote control system when the associated signal lever is operated to a reverse position including one which serves to energize said system of circuits in the direction required for the control of the signal governed by the operated lever and another which serves to render such signal responsive to traffic conditions as reflected by said system of circuits, the starting circuit for said one control code including contacts of both direction locking relays, whereby each direction locking relay when operated renders said remote control system ineffective to change the condition of said system of circuits, means effective when either signal lever is reversed for operating the direction locking relay for the traffic direction governed by such lever in response to a block clear indication received by the associated block indication relay, means for releasing said direction locking relay effective only when said block indication means indicates that the block is clear, the last operated signal lever occupies its normal position and said signal indication means indicates that the signals controlled thereby are at stop, a starting circuit controlled by each direction locking relay for automatically initiating the transmission of a control code by said remote control system which serves to restore said system of circuits to its normally deenergized condition, and means controlled by the associated block indication relay for completing such starting circuit concurrently with the release of said direction locking relay.

2. Railway traffic controlling apparatus for governing the operation of railway signals located at opposite ends of a traffic block, comprising an electroresponsive device at the location of each signal for controlling such signal, a normally deenergized system of reversible circuits extending the length of the block and arranged to be energized at either end to control the electroresponsive device at the other end in accordance with traffic conditions in said block, a traffic relay at each signal location which in a first position renders the signal at that location responsive to traffic conditions in said block by enabling the energization of the associated electroresponsive device over said system of circuits and in a second position effects the energization of said system of circuits in the direction required for the control of the electroresponsive device at the other end of the block, a signal lever for each signal located at a control office, a communication system for transmitting control codes to said signal locations for controlling said signals in accordance with the positions of said levers and for transmitting indication codes to said office which reflect the condition of said signals and also of said electroresponsive devices to indicate the condition of said traffic relays and whether or not the block is occupied, a starting button for each signal lever for initiating the transmission of a control code to the location of the corresponding signal which reflects the position of such lever, means responsive to the operation of each starting button when the associated signal lever is reversed for initiating the transmission of a control code which renders the signal controlled thereby responsive to the energization of the associated electroresponsive device, and in the event both traffic relays are in their first position for additionally initiating the transmission of a second control code which operates the traffic relay associated with the other signal to its second position, and means at said office rendered effective upon the reception of indication codes indicating that the block is vacant and that the operated signal has been restored to its stop position, and also dependent upon the restoration of the operated lever to its normal position for automatically initiating the transmission of a third control code by which the operated traffic relay is restored to its first position.

3. Railway traffic controlling apparatus for governing the operation of railway signals located at opposite ends of a traffic block, comprising a normally deenergized system of reversible circuits for controlling electroresponsive devices at the locations of said signals in accordance with traffic conditions in said block, a traffic relay at each signal location which in a normal position renders the associated electroresponsive device responsive to the energization of said system of circuits and in a reverse position effects the energization of said system of circuits in the direction required for the control of the electroresponsive device at the other end of the block, control levers for said signals located at a control office, a remote control system controlled by said levers having means associated with said signal lever for manually initiating the transmission of control codes for selectively operating the traffic relay at either end of the block to its reverse position and for rendering the signal at the other end of the block responsive to the energization of the associated electroresponsive device, said remote control system also including indication means at the office operated automatically by said remote control system to indicate the condition of said electroresponsive devices and of said signals, whereby either signal may be manually cleared to permit a train to enter the block and its condition and the movement of a train governed thereby is indicated automatically at said office, and means at said office controlled by said indication means and rendered effective by the return of such signal to its stop position and by the return of its control lever to normal following the movement of a train into the block for automatically initiating the transmission of a control code for restoring the operated traffic relay to its normal position in response to the operation of said indication means when said train vacates the block.

4. Railway traffic controlling apparatus comprising an electroresponsive device at each end of a traffic block, a normally inactive system of reversible circuits for controlling said devices, a traffic relay at each end of the block, means controlled by each traffic relay when operated to render said system of circuits active to control the device at the other end in accordance with traffic conditions in said block, a block indication relay and a direction locking relay for each said device located at a control office, manually operable control means at said office, means rendering the operation of said control means effective only when both direction locking relays are released to selectively operate the traffic relay at either end of the block to thereby energize the electroresponsive device at the opposite end provided the block is unoccupied, means controlled by each electroresponsive device when so energized for energizing the block indication and direction locking relays associated therewith, means preventing a change in the condition of either traffic relay as long as either direction locking relay is energized, a direction indicator lamp for each direction and a block indicator lamp located at said office, energizing circuits for said block indicator lamp each including a back contact of one of said block indication relays and in series therewith a front contact of the associated direction locking relay, an energizing circuit for each direction indicator lamp including front contacts of the corresponding block indication and direction locking relays in parallel, and a holding circuit for each direction locking relay effective to prevent its release upon the restoration of said manually operable means to its normal condition unless the associated block indication relay is energized.

5. In a centralized traffic control system for railroads, a stretch of single track divided into a plurality of track sections provided with a system of reversible circuits of the coded type, a head block signal at each end of the stretch for governing train movements into the stretch and intermediate signals for governing train movements through the stretch in both directions, an intermittently operable communication system connecting said signal locations with a control office, a signal lever for each signal, a block indication relay and a direction locking relay for each direction at said office, a code transmitter at each end of the stretch manually controllable from the office by the operation of said communication system for supplying coded current to said track circuit system at the corresponding end to effect the clearing of the head block signal at the opposite end and the intermediate signals for the same direction and to also operate the corresponding block indication relay through said communication system to indicate at the office when the stretch is unoccupied, means for operating each direction locking relay in response to the operation of the associated block indication relay, means effective only when both direction locking relays are released for automatically operating said communication system to set the code transmitter at either end into operation when the lever for the signal at the other end is reversed and said communication system is manually operated for clearing such signal, said code transmitter continuing to operate until released, and means controlled by said block indication relay for automatically operating said communication system to effect the release of said code transmitter when an indication is received indicating that the stretch is unoccupied, said releasing means being effective only if the corresponding head block signal has been restored to stop and its control lever has been returned to its normal position.

6. Railway traffic controlling apparatus comprising a first and a second track section, a code transmitter for each section which when energized supplies current to the rails of its section, a track relay arranged to be connected across the rails of the first section when the code transmitter for that section is released, an approach relay responsive to the current supplied to the second section, a repeating relay which is operated by said approach relay when a train approaches within a predetermined distance in said second section, means at the remote end of said first section for supplying code impulses thereto to periodically energize said track relay, a circuit including a back contact of said track relay for periodically energizing the code transmitter for the second section to repeat said impulses into said section to govern said approach relay, a circuit including back contacts of said track relay and of the code transmitter for the second section, and a contact of said repeating relay for briefly energizing the code transmitter for the first section to deliver feed back impulses to said first section, and means at the remote end of said first section responsive to said feed back impulses for indicating the condition of said approach relay.

7. Railway traffic controlling apparatus comprising a first and a second track section, a track relay for each section, a code transmitter for each section which when energized supplies current to the rails of its section and when released connects the track relay for its section across the track rails thereof, means at the remote end of each section for at times supplying code impulses thereto to periodically energize the track relay for that section, a circuit for the code transmitter for each section including a back contact of the track relay for the other section for causing its periodic operation to repeat into its section the code impulses received from the other section, an approach relay controlled by the impulses supplied to one section which detects when a train in said section approaches within a predetermined distance of the other section, and a circuit controlled by said approach relay for briefly energizing the code transmitter for the other section each time the code transmitter for said one section is energized to supply feed back impulses to said other section, and means at the remote end of said other section responsive to said feed back impulses for indicating the condition of said approach relay.

8. Railway traffic controlling apparatus comprising a first and a second track section, a code transmitter for each section which when energized supplies current to the rails of its section, a track relay arranged to be connected across the rails of the first section when the code transmitter for that section is released, means at the remote end of said first section for supplying code impulses thereto to periodically energize said track relay, a circuit for the code transmitter for the second section including a back contact of said track relay for causing its periodic operation to repeat into the second section the impulses received from the remote end of the first section, an approach relay controlled by the impulses supplied to the second section which detects when a train in said section approaches within a predetermined distance of the first section, a circuit controlled by said approach relay for briefly energizing the code transmitter for the first section in multiple with the code transmitter for the second section to supply feed back impulses to said first section, and means at the remote end of said first section which responds to said feed back impulses to indicate the condition of said approach relay.

9. In a centralized traffic control system for railroads, a stretch of railway track divided into blocks each including one or more track sections, a system of normally deenergized reversible coded track circuits for each block arranged to be energized in cascade in response to manual control from a central office, signals at the ends of the sections for governing traffic movements in opposite directions through the blocks, code transmitting means at each end of each section for supplying coded track current of a first frequency to the track rails of such section to cause the signal at the opposite end of the section to indicate caution when one track section in advance thereof is unoccupied, to supply a second frequency to the track rails of such section to cause the signal to indicate proceed when two sections in advance thereof are unoccupied, and to supply a third frequency to said track rails which also causes the signal to indicate proceed, when the block contains three or more sections in advance of the signal and all are unoccupied, manually operable levers at said office for effecting the energization of said track circuit system one block at a time as required to cause the signals for such block to be cleared for the desired direction of traffic movement, a block indicator at the office for each block, code detector means responsive to the current received over the track rails at the entrance end of a block for the established direction when the entire block is unoccupied for controlling the block indicator for that block to indicate said condition, and means controlled by each block indicator for automatically effecting the deenergization of the track circuit system for the corresponding block in response to the indication received at the office when such block is vacated by a train.

10. In a normally shut-down coded track circuit signaling system for a stretch of single track having head block signals at the respective ends of the stretch for governing train movement into the stretch at such ends, driven code transmitting means at each end of the stretch effective when initiated to transmit driven code pulses over the rails toward the opposite end, a communication system connecting the respective ends of said stretch with a distant control office, a signal control lever at the control office for each of said signals, such lever being manually operable to clear and stop positions, means effective for transmitting signal clear or stop controls over said communication system to either selected signal in accordance with the position of its corresponding control lever, means effective upon the transmission of a signal clearing control for the signal at one end of said stretch to automatically cause a control to be transmitted over said communication system to the opposite end of the stretch to initiate operation of the driven code transmitting means at that end, means at each end of the stretch responsive to the reception of driven code pulses over the rails at that end to transmit an indication over said communication system to indicate the direction of the established traffic and the occupied or unoccupied condition of said stretch, direction storing means at the control office conditioned in accordance with the indication of the established direction of traffic, and means at the control office controlled by said direction storing means and acting automatically upon the reception of a stretch clear indication provided said signal lever is in a stop position to transmit a shut-down control to the leaving end of the stretch as selected by said direction storing means to stop operation of the driven code transmitting means at that end.

11. In a centralized traffic controlling system of the character described for a stretch of single track having normally inactive office controlled track circuit code transmitters at the respective ends of the stretch, an outlying track switch at an intermediate point in said stretch operable only upon the release of an associated electric lock, means for releasing said electric lock only upon the reception of track circuit code transmitted through the track rails of said stretch from both ends at the same time, a switch lock lever at the control office having distinctive operated positions for the respective directions of traffic as well as a normal position, means effective upon the operation of said switch lock lever to either of its operated positions for communicating controls from the control office to both ends of said stretch for initiating said code transmitters at such ends, and interlocking means at the control office effective upon the restoration of said switch lock lever to its normal position after said electric lock has been operated for allowing the communication of a control from the control office for rendering said track circuit code transmitter inactive at each end of said stretch if that stretch is unoccupied by a train, but such means being effective to render only a preselected one of said code transmitters inactive as preselected by said switch lock lever when said stretch of track is occupied by a train, whereby the dispatcher cannot inadvertently take track circuit code away from a train that has moved off of an outlying track switch and is proceeding in a direction preselected by said switch lock lever.

HENRY S. YOUNG.

References Cited in the file of this patent

UNITED STATES PATENTS

| Number | Name | Date |
|---|---|---|
| 2,342,489 | Preston | Feb. 22, 1944 |
| 2,344,333 | Van Horn | Mar. 14, 1944 |
| 2,344,573 | Van Horn | Mar. 21, 1944 |
| 2,353,421 | Staple | July 11, 1944 |
| 2,357,546 | Preston | Sept. 5, 1944 |
| 2,387,152 | Jerome et al. | Oct. 16, 1945 |
| 2,420,579 | Young | May 13, 1947 |
| 2,430,314 | Van Horn | Nov. 4, 1947 |